United States Patent [19]

Suminokura et al.

[11] 3,961,125

[45] June 1, 1976

[54] TEMPORARY INTERLINING COATED WITH FOAMED ADHESIVE

[75] Inventors: Toshihiko Suminokura; Yojuro Kyogoku; Noboru Yasumoto, all of Neyagawa, Japan

[73] Assignee: Kurashiki Boseki Kabushiki Kaisha, Japan

[22] Filed: Feb. 28, 1975

[21] Appl. No.: 554,328

Related U.S. Application Data

[63] Continuation-in-part of Ser. No. 315,830, Dec. 18, 1972, which is a continuation of Ser. No. 70,542, Sept. 18, 1970, which is a continuation of Ser. No. 692,134, Dec. 20, 1967.

[52] U.S. Cl. .................................. 428/261; 2/97; 2/143; 427/366; 428/262; 428/264; 428/265; 428/310; 428/347; 428/350
[51] Int. Cl.² ..................................... B44D 1/44
[58] Field of Search ........... 428/261, 262, 264, 265, 428/347, 350, 913; 427/366; 2/97, 143

[56] References Cited
UNITED STATES PATENTS

| | | | |
|---|---|---|---|
| 2,774,074 | 12/1956 | Lehmann | 2/97 |
| 2,876,136 | 3/1959 | Ford | 427/366 |
| 3,333,280 | 8/1967 | Hynek et al. | 2/143 |
| 3,481,886 | 12/1969 | Lawes | 260/2.5 |

FOREIGN PATENTS OR APPLICATIONS

| | | | |
|---|---|---|---|
| 210,051 | 12/1956 | Australia | |
| 877,721 | 9/1961 | United Kingdom | 2/243 |

*Primary Examiner*—William J. Van Balen
*Attorney, Agent, or Firm*—Wenderoth, Lind & Ponack

[57] ABSTRACT

A temporary interlining composing a fabric base material and a continuous layer of a foamed adhesive provided on at least one of the surfaces thereof, which is prepared by coating said fabric base material uniformly and continuously with a foamed creamy aqueous solution of an adhesive and drying said solution, said foamed creamy aqueous solution having a viscosity of about 10,000 to about 200,000 c.p.s. at 50° C. and the adhesive being soluble in water and becoming sticky on moistening. Said interlining, when heat and pressure are applied while and after being moistened, adheres to a dress material on the surface of said interlining; however, the adhesive can be washed off in a single washing operation.

7 Claims, No Drawings

TEMPORARY INTERLINING COATED WITH FOAMED ADHESIVE

This application is a continuation-in-part application of our copending application Ser. No. 315,830, filed on Dec. 18, 1972, entitled "Interlining," which is, in turn, a continuation application of Ser. No. 70,542, filed on Sept. 8, 1970, which is, in turn, a continuation application of Ser. No. 692,134, filed on Dec. 20, 1967.

The present invention relates to a temporary interlining coated with foamed adhesive. More particularly, it relates to a temporarily adhesive interlining comprising a fabric base material and a continuous layer of a foamed adhesive provided on at least one surface of said base material, and its manufacture.

There were known different types of interlining: the non-adhesive interlining, the permanent adhesive interlining, and the temporary interlining. The non-adhesive interlining is ordinarily starched on a base material with a brush and bonded to a dress material. Thus, the use of the interlining of this type requires inefficiently and laboriously manual work and the starching with a brush may cause difficulties in providing an interlining with a uniform coating of adhesive. Furthermore, the manual work for starching is unlikely to permit starch to extend uniformly on a base material, whereby excessive and irregular shrinkage may take place after washing. Accordingly, the non-adhesive interlining has the disadvantages for temporary interlining purposes. On the other hand, the permanent adhesive interlining which is coated with a heat-sensitive adhesive polymer can adhere to a dress material by heating, and then the two are sown together. Since the heat-sensitive adhesive polymer of this type is water-insoluble, it is difficult to remove the adhesive present in the fabric base material by washing and products may become so hardened that soft hand may be impaired. Furthermore, repeated washings result in the partial scaling of the adhesive and consequently the accumulation of the scaled adhesive in seams. And the synthetic resin used therefor may melt on application of heat by ironing and give out to the surface of the interlining, thereby resulting in the formation of a so-called "oily stain." The temporary interlining as described hereinabove as the third type and as pertaining to the concept of the present invention is known. For example, U.S. Pat. No. 3,333,280 to Hynek et al teaches a temporary interlining obtainable by various types of methods by which a heat-seal composition may be applied to the fabric: the types described therein are the deposition-from-dispersion method and the liquid deposition method. This patent discloses that in the former method it is critical that the solids of heat-sealable composition be small enough to stay suspended yet coarse enough to effect a discontinuous surface coating. Said Hynek et al patent also discloses that in the latter method it is essential that the liquid have a viscosity between about 250 c.p.s. (centipoises per second) and about 500 c.p.s. to insure that the particles remain uniformly dispersed in the liquid phase and not settle out. However, this method is expected to have some disadvantages because it may require a relatively great amount of control to select an appropriate particle size of the solids and an appropriate fabric base material having a property and structure disallowing the solids to penetrate thereinto, such as yarn density, yarn denier, or yarn twist or because it may require the liquids having a considerably high viscosity to stay on the surface of the fabric as a discontinuous coating.

Accordingly, it is an object of the present invention to provide a temporary adhesive interlining which can obviate the disadvantages that conventional interlinings possess. Another object of the present invention is to provide a temporary adhesive interlining which permits an easy removal of its adhesive even in a single washing operation. A further object of the present invention is to provide an interlining of temporary adhesiveness whiich can facilitate sewing a dress material and a fabric base material without difficulty which may otherwise arise. A further object of the present invention is to provide a temporary interlining having a uniform and continuous coating of a foamed adhesive, producing excellent properties in both adhesiveness and ease of removal of the adhesive which function as a temporary adhesiveness. Another feature of the present invention is a method of manufacturing such a temporary adhesive interlining. Other objects, features and advantages of the present invention will become apparent during the course of the specification and the appended claims.

It has been found that the disadvantages associated with said conventional interlinings are to be obviated by the use of an adhesive having a comparably low viscosity in a form that can provide a uniform and continuous layer of an adhesive on one surface of the fabric base material, but that can prevent the adhesive from penetrating into the fabric and adhere, on moistening, to a dress material positioned on the surface of the interlining.

The adhesive to be used for the formation of an adhesive layer according to the present invention is any substance that is soluble in water and sticky on moistening so such an extent that the adhesive compound can be washed off even by a single washing procedure. Illustrative examples of such adhesive compounds are: (1) a water-soluble cellulose derivative such as, for example, carboxymethyl cellulose or methyl cellulose, (2) a water-soluble starch derivative such as, for example, carboxymethyl starch or hydroxyethyl starch, (3) a water-soluble natural gum such as, for example, tragacanth gum or locust bean gum, (4) a water-soluble alginic acid derivative such as, for example, sodium alginate, (5) a water-soluble acrylic polymer such as, for example, polyacrylic acid, sodium polyacrylate or polyacrylamide, having an intrinsic viscosity, preferably, of about 0.1 to about 2.0, (6) a water-soluble polyvinyl alcohol or partially hydrolyzed polyvinyl acetate having an average degree of polymerization of about 300 to about 3,000 and a degree of hydrolysis of about 60 to about 100 mole percent, (7) a water-soluble copolymer of styrene and maleic acid, (8) a gelatin or agar, and (9) a high molecular weight polyethylene oxide having an average molecular weight of about 30,000 to about 2,000,000. These adhesives may be employed alone or in combination.

In the practice of the present invention, it is essential to use said adhesive in the form of a foam having a viscosity of about 10,000 to about 200,000 c.p.s. as measured at 50°C. The foam may be prepared by mixing or agitating a dispersion or solution of said adhesive while being heated and/or blowing air thereinto to about 1.5 times to 5 times the original volume thereof by conventional mechanical methods.

The concept that a foam of dispersion or emulsion of adhesive can be applied to a non-woven fabric is known by U.S. Pat. No. 2,774,074 to Lehmann. This patent discloses the use of an adhesive in the form of a comparatively concentrated, stable foam to provide a non-woven fabric with a large number of comparatively large hollow spaces because the impregnant of an adhesive is deposited primarily at the contact and intersection points of the fibers. Accordingly, such a foam should be caused and forced to penetrate into the fiber fleece of non-woven fabric, so that the adhesive impregnated enables the fibers at the contact and intersection points to adhere to each other in a sufficiently fixed manner or in such a manner that the adhesive cannot be washed off by repeated washings. However, this concept does not involve a temporary interlining and does pertain to the production of a non-woven fabric which may be used as a base material for the temporary interlining.

The fabric base material to be used for the temporary interlining of the present invention is any material that is used for this purpose. The fabric includes, for example, woven and non-woven fabics of synthetic or natural origin such as, for example, cotton, flax, wool, rayon, cellulose acetate, polyamide, or polyester. A blend of one with the other may also be employed.

A dry layer of an adhesive may be formed on the surface of the fabric base material by coating an aqueous solution of the adhesive on the fabric base material and drying said aqueous solution. However, where a conventional adhesive for temporary adhesiveness is used, it is obvious that the penetration of the adhesive into the fabric base material cannot be prevented because of its flowability or fluidity and penetrating capacity, thereby wasting a considerable amount of the adhesive and at the same time requiring a redundant amount of the adhesive to achieve the subsequent adherence to a dress material. In this case, however, the adhesive present in the fabric may give out to both the surfaces of the dress material and the fabric base material by application of heat, thereby causing difficulties in handling the interlining. An interlining in which its fabric base material contains an adhesive has also the tendency to become hardened. Furthermore, it is very difficult to remove from the fabric base material the adhesive which has once been penetrated thereinto, even by a plurality of washings.

The temporary interlining of the present invention may be produced by coating a foamed creamy aqueous solution of an adhesive on a fabric base material and drying the resulting product. The foamed creamy aqueous solution may be prepared by dispersing uniformly about 5 to about 20 parts by weight of said adhesive and mixing under heating and/or bubbling. For example, about 5 to about 20 parts by weight of a polyvinyl alcohol or partially hydrolyzed polyvinyl acetate having an average degree of polymerization of about 1,500 to about 30,000 and a degree of hydrolysis of about 60 to about 100 mol percent are dispersed uniformly and homogeneously in about 40 to 120 parts by weight in water. When desired, to this uniform dispersion, up to about 15 parts by weight of a polyvinyl alcohol or partially hydrolyzed polyvinyl acetate having an average degree of polymerization of about 200 to 1,000 and a degree of hydrolysis of about 60 to 100 mol percent and/or up to about 1 part by weight of sodium polyacrylate having an intrinsic viscosity of about 0.1 to about 2.0 in about 40 to about 120 parts by weight of water can be added. The resulting dispersion is then heated to about 50° to about 100°C. while being agitated to make a foam having about 1.5 to about 5 times the original volume and adjusted in such a manner that the resulting foam has a viscosity of about 10,000 to about 200,000 c.p.s. at 50°C. The resulting foam is then applied to one surface of the fabric base material and dried in a conventional manner. A dress material is then placed on the surface of a uniform coating of foamed adhesive, and the product is sprayed with a sprayer and pressed with an iron allowing the moistened adhesive layer on the surface of the fabric base material to adhere to the dress material. Alternatively, it is possible to moisten and press the product simultaneously at one time by means of a steam iron.

The use of the temporary interlining according to the present invention enables to avoid inefficient and laborious manual work required for the conventional starching method, thereby achieving the improvement in efficiency for dress manufacture. Since the temporary interlining of the present invention employs a foamed adhesive having a relatively low viscosity, it is easy to achieve a uniform and continuous coating on the surface of the fabric base material, and such an interlining allows its base material to stretch to a small extent in the coating operation so that shrinkage which may takes place after washing is lessened, thereby giving the product little deformation and forming little creases. Moreover, the temporary interlining of the present invention can obviate the disadvantages of the permanent adhesive interlining with a heat-sensitive adhesive layer, such as partial scaling of the adhesive, accumulation of the scales in seams, formation of oily stains on repeated washings and ironinings, and excessive hardening of interlining. The interlining of the present invention can achieve the requirements for modern clothes, such as soft hand, comfortability, and resistance to deformation.

The following examples illustrate the present invention without, however, limiting the same thereto. In the following examples and comparative examples, part or parts are by weight.

EXAMPLE 1

20 parts of polyvinyl alcohol (PVA) having an average degree of polymerization of about 1,700 and a degree of hydrolysis of 88 mol percent were dissolved in 80 parts of water at 50°C., and the resulting solution was foamed with a mixer to about 2.5 times the original volume. The resulting foam was adjusted to have a viscosity of about 44,000 c.p.s. at 45°C. and coated on a resin-finished, plain woven fabric with 64 × 48 ends per inch and made of all cotton double yarn of 30 counts by means of a horizontal knife-on-roll coater having a gauge of 0.15 mm. The coated fabric was then dried at 50° to 100°C. for 5 minutes to give an interlining bearing a foamed adhesive dry layer on the surface thereof. The amount of the adhesive stuck on the fabric was found to be about 15 g./sq. cm. Broadcloth, as the dress material, was then placed on the surface of the interlining and pressed with a steam iron to insure that the product was firmly and uniformly bound to each other. The resulting product was then subjected to washing and found to permit it to separate from each other upon a single washing operation. The resulting product did not adhere to each other again..

EXAMPLE 2

20 parts of PVA having an average degree of polymerization of about 500 and a degree of hydrolysis of about 88 mol percent were dissolved in 80 parts of water at 30°C., and the resulting solution was foamed by means of a mixer to about 1.5 times the original volume. The resulting foam was adjusted to have a viscosity of 5,000 c.p.s. at 24°C. and coated on a plain woven fabric with 54 × 42 ends per inch and made of 65 percent of "Dacron" (polyethylene terephthalate fiber) and 35 percent of cotton blended yarn of 12 counts by means of a coater with a gauge of 0.2 mm. The resulting interlining was then dried at 80°C. for 2 minutes. The amount of the adhesive stuck on the fabric was found to be about 20 g./sq. m. A dress material was applied to the surface of the interlining, and the product was subjected to washing in the same manner as in Example 1. The same results were obtained as above.

The same process as above was repeated using the same conditions and procedures except for the use of a non-woven fabric having a thickness of 0.25 mm. and a weave density of 35 g./sq. m., the non-woven fabric being produced from 60 parts of a web consisting of a 1:1 ratio of Dacron staple fiber (3 denier × 51 mm.) and acetate staple fiber (3 denier × 51 mm.) and 40 parts of a binder instead of said blended yarn of Dacron and cotton. In this case, the same results were also obtained.

EXAMPLE 3

15 parts of PVA having an average degree of polymerization of about 2,000 and a degree of hydrolysis of 80 mol percent, 5 parts of PVA having an average degree of polymerization of about 500 and a degree of hydrolysis of about 88 mol percent, and 0.5 part of pulverized sodium polyacrylate having an intrinsic viscosity of 0.7 were compounded to make a homogenous mixture. The mixture was dispersed uniformly in 80 parts of water at 10° to 25°C. and foamed while being agitated at 80°C and 200 to 2,000 r.p.m. to 2 times the original volume. The creamy liquid thus obtained microcelllike foam and had a viscosity of 70,000 c.p.s. at 50°C. The resulting foamed creamy solution was heated at 35° to 80°C. and coated on the same fabric as used in Example 1. The coated fabric was dried to give an interlining having a dry uniform layer of adhesive on its surface. The amount of the adhesive was found to be from about 10 to 40 g./sq.m. Broadcloth, as the dress material, was placed on the surface of the interlining, moistened by means of a sprayer and pressed with an iron to secure the interlining and the dress material together.

The product was then cut to 2.5 cm. wide and 15 cm. long. The resulting test specimen was torn off at one end, and both materials at one end of the torn product was set on a tensile testing machine equipped with an autographic recorder. After the test specimen was stripped off by 5 cm., it was further pulled apart by 10 cm. at an extension rate of 10 cm. per minute while the change in tension was recorded. The strength of peeling was expressed as the average value of the three highest readings and the three lowest readings from the graph, showing that, in this case, the peeling strength was found to be more than 500 grams when pressed with a hand iron and to be more than 1,000 grams when pressed with a high pressure press such as a finishing press. Moreover, it was found that the fluctuation of tension values during measurement was small, thus indicating a uniform adherence between the fabric base material and the dress material.

As a control, an interlining was prepared from a conventional adhesive agent by applying to the same fabric base material as above, and the dress material identical to that described above was placed on said interlining. The resulting product was treated and tested in the same manner as above. Since the thickness of the adhesive layer on the fabric base material was not uniform, the tension values determined varied within such a wide range, namely, within a range in the order of from a few grams to about 1 kilograms depending upon the determined site of the test specimen, so that the indication of the peeling strength for this specimen was meaningless and impossible.

EXAMPLE 4

10 to 20 parts of PVA having an average degree of polymerization of 1,000 to 2,000 and a degree of hydrolysis of 78 to 90 mol percent and 3 to 20 parts of PVA having an average degree of polymerization less than 1,000 and a degree of hydrolysis of 78 to 100 mol percent were compounded to make a homogeneous mixture.

In other cases, up to 1 part of pulverized sodium polyacrylate having an intrinsic viscosity of 0.5 to 1.0 was added thereto. The resulting mixture was treated in the same manner as above to make a foam having about 1.5 to 3 times the originial volume. The resulting foam having an apparent density of 0.3 to 0.7 and a viscosity of 10,000 to 200,000 c.p.s. at 50°C. showed good adhesion prior to washing and complete removal on washing.

EXAMPLE 5

A solution of 3 parts of carboxymethyl cellulose in 97 parts of water was admixed with a solution of 2 parts of sodium alginate in 30 parts of water. The mixture was foamed by means of a mixter to 2 times the original volume. The foamed creamy mixture was adjusted to have a viscosity of 35,000 c.p.s. at 26°C. and coated on the surface of the fabric identical to that of Example 1. The amount of the adhesive stuck on the fabric was found to be from about 5 to 10 grams per square meter. The interlining was then treated in the same manner as above to give a product by applying the dress material similar to that described above to the surface of said interlining. The test showed that said product had the peeling strength at a level similar to those indicated above for the interlining of the present invention.

Comparative Example 1

The process was carried out in a way substantially similar to that of Example 3 of U.S. Pat. No. 3,333,280 using an EVA-copolymer.

200 parts of a 55% solution of EVA-copolymer (Sumikaflex-400, registered trade mark of Sumitomo Chemical Company, Limited) were dispersed in 20 parts of water to give a coating emulsion which was found to have a viscosity of 150 c.p.s. at 25°C.

A bleached, Sanforized broadcloth (65% Tetoron (registered trade mark of Toray Company, Ltd.) and 35% cotton) measuring 2.435 yards per pound of a 12s × 12s count in a 36 inch width was coated on one surface with said emulsion by means of a spray gun at an air pressure of 2 kg./sq.cm. and dried at 120°C. The amount of the coating was found to be 12.5% based on the weight of the fabric base material.

Broadcloth, as the dress material, was then put on the coating surface of the said interliner and pressed at 150°C and 1 kg./sq.cm. by means of an auto-presser, whereby the interliner was bonded to the dress material.

The product thus obtained was laundered, rinsed, and dried centrifugally. An auto-presser was applied again to the product at 150°C. and 1 kg./sq.cm. and for 2 seconds. The re-ironing caused the dress material to adhere partly to the fabric base material.

COMPARATIVE EXAMPLE 2

The process was repeated in a manner substantially similar to that of Example 4 of U.S. Pat. No. 3,333,280.

25 parts of a 55% solution of EVA-copolymer (Sumikaflex-400), 4 parts of a colloidal silica (Nipseal VN-3, registered trade mark of Nissan Chemicals Co., Ltd.; particle size of 0.20 micron) and 4 parts of water were emulsified to give an emulsion having a viscosity of 9 c.p.s. at 25°C.

Said emulsion was then treated in substantially the same way as in Comparative Example 1. In this case, to, the re-ironing allowed the interliner to adhere to the dress material.

What we claim is:

1. In an interlining of temporary adhesiveness comprising a fabric base material and a dry layer of an adhesive thereon, the improvement which comprises using said adhesive in the form of a foam having a viscosity of from about 10,000 to about 200,000 c.p.s. as measured at 50°C., providing a continuous coating layer of said foam on one surface of the fabric base material, and drying said continuous coating layer, said adhesive being soluble in water and sticky on moistening and being a member or a combination of members selected from the group consisting of water-soluble cellulose derivatives, water-soluble starch derivatives, water-soluble natural gums, water-soluble alginic acid derivatives, water-soluble acrylic polymers having an intrinsic viscosity of about 0.1 to about 2.0, polyvinyl alcohol or partially hydrolyzed polyvinyl acetate having an average degree of polymerization of about 300 to about 3,000 and a degree of hydrolysis of about 60 to about 100 mol percent, water-soluble copolymers of styrene and maleic acid, gelatin, agar and high molecular weight polyethylene oxides having an average molecular weight of about 30,000 to about 2,000,000.

2. The interlining of temporary adhesiveness according to claim 1, wherein the water-soluble cellulose derivative is a member selected from the group consisting of carboxymethyl cellulose and methyl cellulose.

3. The interlining of temporary adhesiveness according to claim 1, wherein the water-soluble starch derivative is a member selected from the group consisting of carboxymethyl starch and hydroxyethyl starch.

4. The interlining of temporary adhesiveness according to claim 1, wherein the water-soluble natural gum is a member selected from the group consisting of tragacanth gum and locust bean gum.

5. The interlining of temporary adhesiveness according to claim 1, wherein the water-soluble alginic acid derivative is sodium alginate.

6. The interlining of temporary adhesiveness according to claim 1, wherein the water-soluble acrylic polymer is a member selected from the group consisting of polyacrylic acid, sodium polyacrylate and polyacrylamide.

7. The interlining of temporary adhesiveness according to claim 1, wherein said adhesive is foamed to about 1.5 times to about 5 times the original volume thereof by agitation.

* * * * *